United States Patent [19]

Kinoshita et al.

[11] Patent Number: 4,912,384
[45] Date of Patent: Mar. 27, 1990

[54] EMERGENCY STOP CONTROL CIRCUIT

[75] Inventors: Yasunori Kinoshita, Kunitachi; Yoshihiro Nakashima, Machida, both of Japan

[73] Assignee: Fanuc Ltd., Minamitsuru, Japan

[21] Appl. No.: 353,677

[22] PCT Filed: Sep. 22, 1988

[86] PCT No.: PCT/JP88/00975
§ 371 Date: May 3, 1989
§ 102(e) Date: May 3, 1989

[87] PCT Pub. No.: WO89/03548
PCT Pub. Date: Apr. 20, 1989

[30] Foreign Application Priority Data

Oct. 7, 1987 [JP] Japan .................... 62-252683

[51] Int. Cl.[4] ............................................. G05D 3/10
[52] U.S. Cl. ................................ 318/569; 318/484; 318/85; 364/474.12; 361/189; 361/188
[58] Field of Search ................ 318/560–634, 318/484; 364/474.11, 474.14, 474.12, 474.19, 468, 513, 191, 171, 188, 186, 192

[56] References Cited

U.S. PATENT DOCUMENTS

| 3,424,919 | 1/1969 | Howlett | 361/192 |
|---|---|---|---|
| 4,091,438 | 5/1978 | Olding et al. | 361/189 |
| 4,279,013 | 7/1981 | Cameron et al. | 364/474.12 X |
| 4,349,856 | 9/1982 | West et al. | 361/192 X |
| 4,376,913 | 3/1983 | Higby | 318/85 |
| 4,467,260 | 8/1984 | Mallick Jr. et al. | 364/474.19 |
| 4,490,659 | 12/1984 | Hansen | 361/189 X |
| 4,543,517 | 9/1985 | Poppelreiter II | 318/561 X |
| 4,591,731 | 5/1986 | Garcia | 361/189 X |
| 4,641,236 | 2/1987 | Brooks | 318/568.1 |
| 4,697,231 | 9/1987 | Boyter et al. | 364/188 |

Primary Examiner—Vit W. Miska
Assistant Examiner—Paul Ip
Attorney, Agent, or Firm—Staas & Halsey

[57] ABSTRACT

An emergency stop control circuit of a numerically controlled machine tool for controlling emergency stop signals. A relay circuit (1) is provided with input terminals connected to an emergency stop button (22), an overload switch (33), and overtravel switches (34, 35), which are the sources of all emergency stop signals generated by the numerically controlled machine tool. The relay circuit is also provided with output terminals, i.e., contacts (2a, 2b, 2c), connected as necessary to various units including for example, a numerical control apparatus, a servo amplifier, and a spindle amplifier. Accordingly, an emergency stop control circuit requiring only simple connections can be provided. This eliminates the need for a complicated wiring operation.

2 Claims, 1 Drawing Sheet ative to the stroke thereof.

EMERGENCY STOP CONTROL CIRCUIT

BACKGROUND OF THE INVENTION

The present invention relates to an emergency stop control circuit for controlling emergency stop signals of a numerically controlled machine tool. More particularly, the present invention relates to an emergency stop control circuit which can be easily incorporated into a numerically controlled machine tool.

BACKGROUND ART

In numerically controlled machine tools, an emergency stop signal is used for protection of the operator and to prevent damage to machinery. It is essential that the machine tools are immediately stopped when an emergency stop signal is generated. Accordingly, the emergency signal cannot be treated in the same way as ordinary control signals, since if an error occurs in an IC, for example, the machine cannot be brought to an emergency stop. Therefore, a small-sized relay or the like is used, together with a button for generating an emergency stop signal. Switches and the like are all connected in series to the relay, and the relay is maintained in an ON state at all times. This ensures that, when the contacts thereof are opened, the power supply to all units is cut off.

This arrangement, however, requires a complicated wiring of connections between various units, such as a machine operator panel, machine switches, a servo amplifier, etc. Thus, difficulties arise not only in design and manufacture but also in maintenance. For example, when an emergency stop signal is generated, it is difficult to identify the cause thereof.

SUMMARY OF THE INVENTION

The object of the present invention is to solve the above problems and provide an emergency stop control circuit which can be easily incorporated into a numerically controlled machine tool.

To solve the aforementioned problems, the present invention provides an emergency stop control circuit for controlling emergency stop signals of a numerically controlled machine tool. The emergency stop control circuit comprises a terminal connected to an emergency stop button of a machine operator panel, a terminal connected to an overtravel release button of the machine operator panel, a terminal connected to an overload switch of a machine, a terminal connected to an overtravel switch of the machine, a relay connected in series to the emergency stop button, the overload switch and the overtravel switch, and terminals for connecting contacts of the relay to a numerical control apparatus (CNC), a servo amplifier, and a spindle amplifier.

The emergency stop control circuit is provided with input terminals corresponding to all possible causes of an emergency stop signal generated by the numerically controlled machine tool, and terminals for outputting signals to the relevant units. Accordingly, only these terminals need be connected, and thus complicated wiring becomes unnecessary.

DESCRIPTION OF THE PREFERRED EMBODIMENT

Figure 1:
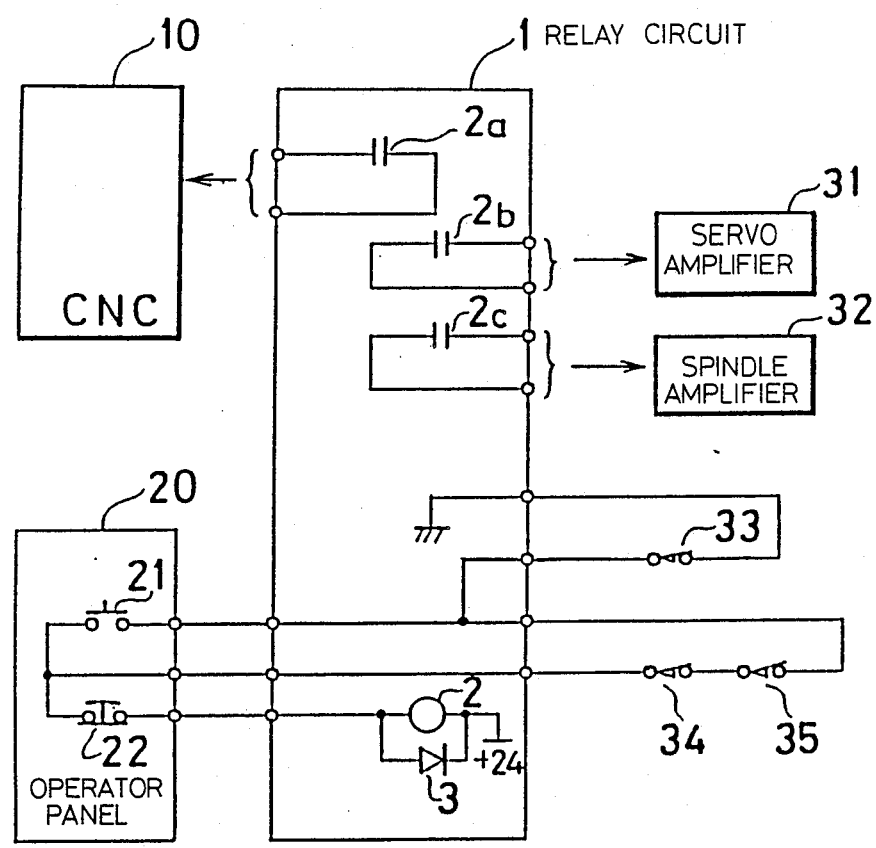
FIG. 1 is a circuit diagram of an emergency stop control circuit according to an embodiment of the present invention.

One embodiment according to the present invention will now be described with reference to the drawing.

In FIG. 1, which is a circuit diagram of an emergency stop control circuit according to the embodiment of the invention, a relay circuit 1 is mounted on a printed circuit board. The printed circuit board is small in size, and thus can be easily incorporated into a compact control circuit of a numerically controlled machine tool. A relay 2, connected in parallel with a diode 3 serving as a noise suppressor, is provided with contacts 2a, 2b, and 2c from which emergency stop signals are output to various units described later.

A numerical control apparatus (CNC) 10 includes a PC (programmable controller). A machine operator panel 20, used for manual operation of the machine tool, is provided with an emergency stop button 22 and an overtravel release switch 21.

A servo amplifier 31 is adapted to drive a servomotor (not shown). Note, although in practice a plurality of units are provided for a plurality of axes used, the figure shows only one unit for simplicity. A spindle amplifier 32 is adapted to drive a spindle motor, and an overload switch 33 of the machine is provided with a contact which is opened when motors for driving various pumps of the machine are overloaded. Overtravel switches 34 and 35 are provided with contacts which are opened when a machine table or the like is moved beyond the stroke thereof. Note, in practice the number of overtravel switches is twice the number of axes, but only two switches for detecting overtravel of one axis in the positive and negative directions, respectively, are illustrated in the figure for simplicity.

The operation of the circuit when the emergency stop signal is generated will now be described. During normal operation, the relay 2 is always in a conductive state. that is, the contacts 2a, 2b, and 2c are closed, and thus each unit is informed that; a normal operation is being carried out. For example, the contact 2b of the relay 2, when closed, allows a supply of power to the servo amplifier 31 by actuating a magnet for supplying power thereto.

When the emergency stop button 22 of the machine operator panel 20 is depressed, or when the overload switch 33, or the overtravel switch 34 or 35 is operated, the relay 2 is turned off that is, the contacts 2a to 2c are opened and an emergency stop signal is sent to each of the units. For example, when the contact 2b is opened, the magnet in the servo amplifier 31 is turned off, and thus the power supply to the servo amplifier 31 is interrupted and operation of the associated servomotor is immediately stopped.

The printed circuit board is provided with input terminals connected to all units of the machine tool which can generate an emergency stop signal, and further, is provided with output terminals. Accordingly, the emergency stop signals can be controlled by using a printed circuit board which requires only simple connections. This eliminates the need for a complicated wiring operation. Alternatively, a small-sized relay unit may be used instead of the printed circuit board.

As is obvious, if necessary the number of input signals and output signals can be increased in accordance with the needs of the machine tool to be controlled, and in this case, the number of the relays may be increased as required.

As described above, according to the present invention, input terminals are provided for all of the emergency stop signals necessary for the machine tool, together with output terminals, and thus the emergency stop signals can be controlled without the need for complicated wiring on the machine side.

We claim:

1. An emergency stop control circuit for controlling emergency stop signals for a numerically controlled machine tool, the system including a numerical control apparatus, a servo-amplifier and a spindle amplifier, comprising:

an emergency stop button on a machine operator panel having a first terminal connected thereto;

an overtravel release button of said machine operator panel, connected to said emergency stop button, having a second terminal connected thereto;

an overload switch, operatively connected to said overtravel release switch, having a third terminal connected thereto;

overtravel switches, operatively connected to said overtravel release button and said emergency stop button, having fourth terminals connected thereto;

a relay, connected in series with said first terminal of said emergency stop button, said third terminal of said overload switch, and said fourth terminals of said overtravel switches, having contacts connected thereto;

fifth terminals, connecting said contacts of said relay to the numerical control apparatus, the servo amplifier, and the spindle amplifier.

2. An emergency stop control circuit according to claim 1, wherein said relay is mounted on a printed circuit board.

* * * * *